United States Patent Office 3,060,237
Patented Oct. 23, 1962

3,060,237
SOLVOLYSIS OF MYRCENE DIHYDROCHLORIDE
Joseph P. Bain, Jacksonville, Fla., assignor to The Glidden Company, Cleveland, Ohio, a corporation of Ohio
No Drawing. Filed Oct. 20, 1958, Ser. No. 768,017
11 Claims. (Cl. 260—602)

The present invention is concerned with a process for the preparation of compounds represented by hydroxy-citronellal, citral, ionone, citronellol, citronellal, hydroxy-dihydro-citronellal, hydroxy-dihydro-citral, and other valuable terpenic compounds useful in perfumery and flavoring. The invention is more particularly directed to a process for the preparation of the foregoing perfumery materials and to novel dihydric allylic alcohols by hydrolysis of myrcene dihydrochloride.

The hydrolysis of myrcene monohydrochloride to produce linalool and geraniol has been described in copending Booth application Serial No. 331,515, filed January 15, 1953 now U.S. Patent No. 2,871,271. Although important quantities of linalool and geraniol can be produced according to that described and claimed invention, that process does suffer from certain disadvantages. The object of the Booth process was to produce an allylic alcohol involving the number 6, 7 and 8 carbon atoms of 2,6-dimethyl-octane, that is, linalool and geraniol. An initial disadvantage in the process is in the hydrochlorination of myrcene according to the prior art by which a portion of the hydrogen chloride is absorbed at the unsaturated 2 and 3 carbon atoms of myrcene to produce 2-chloro-2-methyl-6-methylene-7-octene which is, of course, not subject to hydrolysis to an allylic alcohol. Another disadvantage in that process lies in the very ready cyclization of linalyl and geranyl chlorides to cyclic products, including hydrocarbons and terpineol. The cyclization occurs as an important reaction during the hydrolysis of linalyl and geranyl chlorides.

In the hydrolysis of linalyl and geranyl chlorides, a common resonating ion involving the 6, 7 and 8 carbon atoms is produced as an intermediate in the solvolysis reaction and to the degree that this ion accepts available hydroxyl groups, the process is successful in producing linalool and geraniol. However, this common ion is also capable of reacting with the number 3 carbon atom when a double bond is located at the 2 and 3 position as in myrcene, linalool and geraniol. A new ion is hereby produced which may stabilize itself either by acceptance of a hydroxyl group from the solution with formation of terpineol or through discharge of a proton whereby the ion becomes the cyclic hydrocarbon. As a consequence of these reactions, the overall conversion of myrcene to linalool and geraniol via the described solvolysis offers much to be desired. Linalool and geraniol when produced in this manner become quite expensive when considered in the light of raw materials for conversion to other valuable perfumery ingredients such as citral, citronellol, citronellal, hydroxycitronellal, ionones, etc. Linalool and geraniol can be converted to the named compounds but such conversion is not economical because of the high price of linalool and geraniol.

An object of this invention is to provide novel intermediates other than linalool and geraniol suitable for use in the overall conversion of the cheap and domestically available betapinene to valuable and highly prized alcohols, esters, aldehydes and ketones which have hitherto been produced by isolation from expensive imported oils of uncertain availability.

Another object is to provide a process for producing 2,6 - dimethyl - 7 - octene - 2,6 - diol (2 - hydroxy - dihydro-linalool).

Another object is to provide a process for producing 2,6 - dimethyl - 6 - octene - 2,8 - diol (2 - hydroxy - dihydro-geraniol).

Still another object is to provide a process for preparing valuable oxgenated derivatives of 2-hydroxy-dihydro linalool and geraniol.

A still further object is to convert myrcene to high yields of acyclic terpenic diols of the allylic type and involving the number 6, 7 and 8 carbon atoms in the allylic system.

In accordance with the foregoing objects of this invention, I provide a novel and economical process for accomplishing the objects recited and others which will be apparent from the description of the invention. This invention comprises a method for preparing first, an acyclic dihydric terpene and secondly, derivatives thereof, the dihydric terpene being one wherein one hydroxyl group is attached to the number 2 carbon atom of the 2,6-dimethyl octane skeleton and the other hydroxyl group is attached to an allylic carbon involving the 6, 7 and 8 carbon atoms in the allylic system. The process thus comprises a series of steps involving the treatment of myrcene with a hydrogen halide until said myrcene is converted substantially to myrcene dihydrohalide, the halide being selected from the groups consisting of chlorine, bromine and iodine, and hydrolyzing the dihydrochloride with an aqueous solution containing a base for neutralizing the hydrogen chloride formed during the hydrolysis reaction.

In the above hydrochlorination step, one halogen atom, e.g. chlorine, attaches to the number 2 carbon atom of the 2,6-dimethyl octane skeleton, and the other chlorine attaches to an allylic carbon atom involving the 6, 7 and 8 carbon atoms of the allylic portion of the myrcene molecule, thereby resulting in 2-chloro dihydro geranyl chloride and 2-chloro dihydrolinalyl chloride. The hydrolysis of myrcene dihydrochloride in accordance with the teaching of my invention and the resulting hydrolysis products, presents a unique method for the preparation of valuable compounds in an economical manner not heretofore possible. The process of my invention, in addition to the production of novel intermediates, involves the treatment of the intermediates (2-hydroxy di-hydro-geraniol and linalool) with oxidizing agents such as chromic acid to produce hydroxy-dihydro-citral; copper chromite to produce hydroxy-dihydro-citral and hydroxy-dihydro-citronellal and hydroxy-citronellal, all as will be demonstrated by the specific examples presented hereinafter.

In the best mode of practicing the invention, I treat a pyroloyzed beta-pinene at ambient temperatures with hydrogen chloride gas until at least about 1.8 to 2.0 moles of hydrogen chloride have been absorbed and I thereafter hydrolyze the resulting myrcene dihydrochloride with water and a base which furnishes hydroxyl ions and neutralizes the hydrogen chloride formed during the hydrolysis reaction, the base being used in an amount sufficient to neutralize said hydrochloric acid produced during the hydrolysis reaction. Reaction conditions and embodiments for converting the novel dihydric allylic alcohols produced by this invention to valuable aldehydes and alcohols will be presented with the examples below.

The pyrolysis of beta-pinene to myrcene in high yields has been described in the literature. The myrcene can be isolated by very careful fractionation, but it is ordinarily more economical to employ it as the crude pyrolysate containing, say 65 to 85% myrcene. The impurities in such pyrolysate are known to consist of unreacted beta-pinene, limonene and alpha-camphorene. These impurities will in general hydrochlorinate at different rates but most of the impurities will be hydrochlorinated by the time 2 moles of hydrogen halide are accepted by the myrcene.

Myrcene can be hydrochlorinated by passing in hydrogen chloride gas until the gain in weight of the reaction mixture corresponds to formation of the dihydrochloride. Hydrogen bromide or hydrogen iodide can also be employed, but hydrogen chloride is preferred. The temperature is not critical but I ordinarily prefer to employ temperatures of around 10 to 35° C. since these are satisfactory and convenient to maintain. Temperatures of from −15° to 100° C. can also be used. The hydrochlorination rate is accelerated by use of super atmospheric pressures on the hydrogen chloride through atmospheric pressure and below is quite satisfactory and gives economical rates of addition, particularly when hydrochlorination catalysts are present. The myrcene dihydrochloride resulting from hydrochlorination consists chiefly of a mixture of 2-chloro-dihydrolinalyl chloride and 2-chloro-dihydrogeranyl chloride whose proportions may vary widely depending upon the hydrochlorination conditions and the use or non-use of catalysts such as cuprous chloride for formation of an equilibrium mixture of the two allylic chlorides.

In preparing the myrcene dihydrochloride, I prefer to hydrochlorinate in the presence of about 0.5% cuprous halide, preferably the chloride, based on the myrcene and added to the myrcene prior to hydrochlorination. The addition of the hydrogen chloride to the myrcene is facilitated thereby and the dichloride produced is richer in 2-chloro-dihydrogeranyl chloride than if cuprous chloride is omitted. I believe that better yields of desired products are produced if most of the dichloride is in the geranyl form rather than in the linalyl form, though the difference in yield, if any, is not great.

When the myrcene dihydrochloride is produced in the presence of cuprous chloride and is subjected to the solvolysis reaction under optimum reaction conditions for glycol formation, the oil hydrolysis product will amount to about 115% of the weight of the starting 72–75% grade of myrcene (which is readily produced by pyrolysis of beta pinene). Better yields of desired products are obtained, of course, with better grades of myrcene but yields are proportionate to myrcene content of the starting material.

When myrcene dihydrochloride is subjected to hydrolytic reaction conditions, the allylic chloride atom is hydrolyzed and the common ion produced on this hydrolysis, involving the number 6, 7 and 8 carbon atoms produced from either the linalyl or geranyl form, will accept a hydroxyl ion from the solution to form the corresponding allylic alcohol. The allylic alcohol is chiefly of the linalyl type although appreciable geranyl type is also produced.

A very great improvement in achieving high yields of allylic alcohols in accordance with this invention is the result that no cyclization is possible when the common resonating ion is produced since the halide group is "solvolyzed" away from the molecule. The cyclization is impossible because there exists no double bond involving the number 3 carbon atom of the carbon skeleton since the double bond involving the number 2 and 3 carbon atoms has been satisfied by the addition of hydrogen chloride in the formation of the myrcene dihydrochloride. The saturated carbon containing the chloride atom at the number 2 position is converted to the corresponding alcohol under the conditions of solvolysis I shall outline.

It is know that allylic halides are in general more reactive than saturated tertiary halides and therefore, to a great extent, hydrolysis may take place at the allylic position prior to hydrolysis at the saturated 2-position. The relative rates of hydrolysis are, however, unimportant to the process of this invention since the number 3 carbon atom is protected in any case because there is no double bond present at the 2 and 3 position in either the chloride or its hydrolysis product. If the hydrolysis is conducted at too high a temperature appreciable dehydrochlorination will occur but I find that dehydrochlorination involving the saturated carbon containing the halide atom at the number 2 position results largely in producing an isopropenyl group rather than an isopropylidene group. That is, the double bond appears at the 1 and 2 position largely rather than at the 2 and 3 position. In consequence of this, the number 3 position is still protected insofar as cyclization is concerned since there is no double bond present involving it. This is one of the unique features of the process of this invention.

The hydrolysis of myrcene dihydrochloride is accomplished by contacting it intimately with water and in the presence of a base capable of neutralizing the hydrochloric acid produced in the hydrolysis reaction. The amount of water used is not critical though I prefer to use at least two volumes of water to one volume of dihydrochloride. Much larger ratios of water to dihydrochloride can be used but if too much water is used the problem of recovering the resulting glycol, i.e. the 2-hydroxy dihydrolinalool and geraniol, from the hydrolysis mixture is increased in consequence of the water solubility of the glycols. In general, 3–10 volumes of water is satisfactory.

The base used to neutralize the hydrochloric acid formed on hydrolysis can be any base capable of neutralizing the acid. Thus, for example, carboxylic acid salts of the alkali metals such as sodium acetate, potassium oleate, etc., can be employed and some ester will be produced as well as alcohol. This only results, however, in the additional complication of saponification at a later stage and I therefore, prefer to employ bases which furnish primarily hydroxyl ions such as alkali metal and alkaline earth, hydroxides, carbonates, bicarbonates. Other metal hydroxides such as lead hydroxide or amines can be used, but such use would not be as economical. Where water soluble bases are employed, I prefer to use quite powerful agitation in order to bring the oil and water into intimate contact or employ emulsifiers which decrease the need for very powerful agitation. In general, however, I find that water insoluble bases such as calcium hydroxide or calcium carbonate can be used with excellent results since they are not only capable of furnishing the necessary neutralization of hydrochloric acid but their presence in the solid phase in the mixture insures good contact of oil and water, even under mild agitation conditions, i.e., the solid phase assists emulsification and dispersion.

The quantity of base required for the reaction is, of course, the stoichiometric quantity necessary to neutralize the hydrochloric acid produced on the complete hydrolysis the dihydrochloride. However, in general, I prefer to use somewhat more than the required amount of base to insure that the mixture remains about neutral or alkaline throughout the hydrolysis. In general, about 1.25 to 2.0 equivalents, i.e. 25 to 100% excess of base is found to be very satisfactory and convenient to use.

Hydrolysis takes place readily over the range of 25 to 100° C. The product does hydrolyze but more slowly at temperatures below 25° C. and the time required for complete hydrolysis may become uneconomically long at very low temperatures. Temperatures above 100° C. are operable but the higher the temperature, the more likely dehydrochlorination becomes, and I prefer to avoid such temperatures which would also require pressure vessels and the like to maintain the reagents in the liquid phase. It is convenient to simply mix the ingredients of the reaction, that is, the myrcene dihydrochloride, water, and base at ambient temperatures in a kettle and then heat the mixture under agitation to say 85 or 90° C., and maintain the agitation and this temperature until the hydrolysis is complete. The completion of the hydrolysis can, of course, be determined by any convenient method, such as by assay of the aqueous phase for the amount of ionizable chloride or by analysis of the oil phase to determine that the organic chloride has largely disappeared.

Illustrations of working up the hydrolysis mixture are given in the examples.

Fractional distillation is a preferred method for separation and recovery of the individual constituents of the hydrolysis mixture. All of the various components of the mixture are readily separated by fractionation except the cis- and trans- isomers of geraniol and 2-hydroxy-dihydrogeraniol, that is, the geranyl and neryl forms of these compounds. Fortunately, both cis- trans- isomers are useful and there is no need for their separation. The uses for linalool, terpineol and geraniol are well known and the two conjugated monohydric acyclic alcohols produced in small quantities as by-products of the hydrolysis: 2,6-dimethyl-5,7-octadiene-2-ol and 2-methyl - 6 - methylene-7-octene-2-ol, have pleasant odors and can be hydrogenated to the saturated compound, 2,6-dimethyl-octane-2-ol which is also useful in perfumery.

Two new glycols, 2-hydroxy-dihydro geraniol and 2-hydroxy-dihydro- linalool, are produced by the process of this invention in important amounts. These glycols have pleasant but weak odors and will probably have only limited usage in perfumery per se. Their chief value lies in their utilization as intermediates for further conversions as illustrated in the examples.

The following examples illustrate my invention.

SOLVOLYSIS OF MYRCENE DIHYDROCHLORIDE

*Example 1*

PART A

To four mols (544 grams) of technical grade myrcene of about 75% purity there was added 6.94 mols (253 grams) of HCl gas, using a fritted glass disperser while holding the temperature at 25° C. maximum. This corresponds to an acceptance of two moles hydrogen chloride per mole of myrcene and one mole of hydrogen halide per mole of impurity. Impurities include beta pinene, limonene and alpha camphorene.

A 12-liter flask was fitted with two thermometer wells for baffles and was then charged with 500 grams of calcium carbonate (precipitated chalk) and 5000 grams of water. To this solution there was then added the polyhydrochlorinated product prepared above and the mixture was stirred with a high speed agitator (dispersator) without any external heating. The mechanical energy input, however, raised the temperature to 46° C. and maintained it about there.

Samples of the water phase were withdrawn and filtered clear, then titrated for chloride using 0.1 N AgNO₃ and dichromate indicator. The reaction was stopped when the water layer showed 98% of the theoretical amount of chloride. This required 24 hours of stirring, although the last part of the chlorine was reacted very slowly as shown below:

| Hours: | Percent of Theoretical Chloride in Water Layer |
|---|---|
| 2½ | 66 |
| 10 | 91 |
| 15½ | 96 |
| 24 | 98 |

The remaining CaCO₃ in the mixture was dissolved by the addition of acetic acid and benzene was added to improve the separation of the oil and water layers.

After separation of these, the water layer was saturated with salt and extracted with benzene. This benzene extract amounted to 320 grams (about 355 cc.) and removal of benzene from an aliquot by warming under vacuum showed that the solution contained 29.5% of oil. The oil crystallized in the refrigerator and infrared examination of the crystals isolated therefrom showed a glycol having only tertiary alcohol groups and further characterized by a terminal vinyl absorption. The glycol (2-hydroxy-dihydro-linalool) therefore had the following structure:

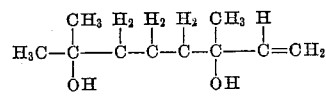

Further proof of the structure of the glycol was obtained as follows:

DEHYDRATION OF 2-HYDROXY-DIHYDRO-LINALOOL

PART B

Fifty (50) cc. of the benzene extract rich in glycol of Part A was added to 200 cc. of water and the benzene was cohobated off, leaving a clear solution of the glycol in water. To this solution was added ten grams of glacial acetic acid and the cohobation then was resumed. Dehydration then occurred and there was collected, as a steam distillate, an oil layer rich in alcohol, but containing also some hydrocarbon and a little ester, a mixture readily separable by distillation. The hydrocarbon boils at about 98–100° C. at 100 mm. and the alcohol at about 82° C. at 10 mm. Since the glycol is not readily steam volatile, the alcohol was monohydric and formed from the glycol by loss of one of its hydroxyl groups. Infrared examination of the alcohol showed that it was a tertiary conjugated alcohol possessing a terminal vinyl group. Ultraviolet examination of the alcohol showed a maximum at 229 mμ indicating the ocimene type of conjugated system. The alcohol was then hydrogenated at room temperature over a platinum catalyst and took up two moles of hydrogen yielding the saturated alcohol 2,6-dimethyl-octane-2-ol identical with that obtained by saturating 2-methyl-6-methylene-7-octene-2-ol. This new alcohol therefore has the structure:

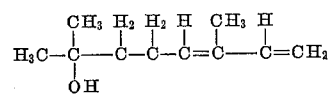

and is 2,6-dimethyl-5,7-octadiene-2-ol.

The hydrocarbon obtained from the linalool glycol by the dehydration reaction above showed an ultraviolet maximum of 229 mμ but also showed an isopropenyl group by infrared examination. Hydrogenation yields 2,6-dimethyl-octane upon absorption of three moles of hydrogen. The hydrocarbon therefore had the structure:

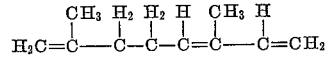

and is α-ocimene. Absence of any ultraviolet absorption except at 229 mμ indicated the absence of myrcene or alloocimene-type systems.

ACETYLATION AND CONVERSION OF 2-HYDROXY-DIHYDRO-LINALOOL

PART C

Fifty (50) grams of the benzene solution of the linalool glycol (benzene extract of the separated aqueous layer) of Part A was mixed with 20 grams of acetic anhydride and 2 grams of sodium acetate. The mixture was then heated to refluxing. After 3 hours of refluxing the reaction was stopped, sampled and examined to find that esterification was partial, and 10 more grams of acetic anhydride was added and refluxing was continued for 10 more hours. This reaction converted most, but not all, of the hydroxyl groups. Upon examination by infrared of the final reaction product freed of benzene, there was no evidence of splitting out of water or acetic acid, that is, there were no terminal methylene or conjugated groups formed, so it was evident that the glycol could be acetylated practically quantitatively in boiling benzene if sufficient time were allowed. Since the retention of the terminal vinyl group was good the reaction indicated that little allylomerization had taken place so far and the product consisted of the diacetate of the starting 2-hydroxy-dihydro-linalool.

The glycol diacetate formed by the reaction above was washed and dried and then mixed with 2 grams of sodium acetate, 5 grams of acetic anhydride and 20 grams of glacial acetic acid and refluxed for 11 hours. This procedure converted the diacetate of 2-hydroxy dihydro linalool to a α-geranyl-acetate and hydrocarbons. Saponification of the crude geranyl acetate yielded about 40% α-geraniol in hydrocarbons. Small amounts of other alcohols were also present. The only other alcohol identified was the glycol, 2-hydroxy-dihydro-geraniol.

PURIFICATION OF 2,6-DIMETHYL-7-OCTENE-2,6-DIOL (2-HYDROXY-DIHYDRO-LINALOOL)

PART D

Crude 2,6-dimethyl-7-octene-2,6-diol obtained from the benzene extract of the aqueous layer of the reaction product of Part A was cooled to about 8° C. to crystallize it and was then centrifuged. The crystals obtained were stable at room temperature. A small amount of the crystals were slurried with cold light naphtha in which it is not readily soluble and air dried on blotting paper. The melting point of the crystals taken thereafter was 49° to 50° C.

Subsequent preparations of larger quantities by fractionation by distillation showed the glycol to have these properties: Boiling point 125° C. at 10 mm.; $N_D^{25}$ 1.4654; $D_4^{55}$ 0.9142; M.P. 52.2° C. The glycol readily hydrogenates to 2,6-dimethyl octane-2,6-diol.

The mother liquor from the initial crystallization above was mixed with light naphtha with which is was not completely soluble and a little more benzene was added to make the solution complete. In a short period thereafter crystals were deposited. After cooling to complete crystallization, the crystals were filtered off, dried and made into a Nujol Mull. Infrared examination of this showed the identity of the crystals as terpin hydrate.

PART E

The oil layer initially separated with the aid of a little benzene from the solvolysis reaction of Part A above, amounted to 382 grams after freeing it of benzene. Infrared examination of this oil, on a benzene free basis, showed 24% α-terpineol together with the linalool type glycol above, and lesser amounts of other products.

The oil layer was then extracted twice with 3 liter portions of water and the linalool type glycol was recovered from the water extract by salting and extraction with benzene. The extract was steam distilled to remove benzene and steam volatile oils from the relatively non-volatile glycol. The amount of glycol recovered was 52 grams. The oil phase remaining after the water extractions was next steam distilled by cohobation over 2.75% potassium carbonate, giving a distillate of 468 grams assaying 54% oil by removal of the benzene under vacuum. The residue from the steam distillation was recovered and totaled 56 grams. Infrared examination of the residue showed considerable alcohol content, part of which was geraniol.

Although the 2-hydroxy-dihydro-linalool recovered in every instance was free of chloride by the Beilstein flame test, the oils from which it was separated were not. Accordingly, the 468 gram steam distillate was dried and then treated with 10 grams of sodium metal to remove the last traces of chlorine. The sodium and benzene-oil solution was then heated and stirred, distilling off enough benzene to bring the pot temperature above the melting point of sodium. The treatment was continued for 8 hours. Water was thereafter cautiously added and the oil layer separated and washed. The product was now free of chloride by the Beilstein flame test. Column distillation and infrared assay of the fractions showed the composition of the distillate as follows:

| | Grams |
|---|---|
| Terpenic hydrocarbons | 29 |
| Linalool | 84 |
| α-Terpineol | 92 |
| Geraniol | 10 |
| Unidentified | 12 |
| Total recovery | 227 |

Since 252 grams of terpenic products were charged to the sodium treatment, there was a loss of 25 grams in the combined sodium treatment and column distillation steps.

SUMMATION OF PRODUCTS

In

| | Grams |
|---|---|
| Myrcene (4.0 mols) | 544 |
| HCl (6.96 mols) | 253 |
| | 797 |

Recovered

| | Grams |
|---|---|
| Total linalool type glycol from solvolysis reaction | 161 |
| Monohydric alcohols: | |
| Linalool | 84 |
| α-Terpineol | 92 |
| Geraniol | 10 |
| | 347 |

Miscellaneous

| | |
|---|---|
| Recovered hydrocarbons | 29 |
| Unidentified volatile oils | 12 |
| Residue | 56 |
| Loss accounted for | 25 |
| Total | 469 |

From the spectra and other properties of mother liquors from which the linalool type glycol was crystallized and certain residues from distillation of crude 2-hydroxy-dihydro-linalool, it was recognized that there was present in the crude solvolysis product a second glycol characterized by greater water solubility and higher boiling point. It was present to a much lesser extent than the first glycol and was therefore more difficult to recover in pure form from the small preliminary experiment described. It was found possible, however, to isolate a fraction by distillation that was rich enough in this new glycol to permit its infrared study and to establish its spectrum. Through working up additional solvolysis crudes and in the light of some knowledge of its properties acquired from the described experiment, the new glycol was isolated in pure condition and in good quantity. These properties were determined on a pure sample: B.P. 132° C. at 1.5 mm., $N_D^{25}$ 1.4779, $D_0^{25}$ 0.9520. It is more soluble in water than the 2-hydroxy dihydro linalool, less soluble in benzene. The new glycol was found to be 2,6-dimethyl-6-octene-2,8-diol, 2-hydroxydihydro geraniol. It is likely that both possible cis trans isomers are present.

The structure of this new glycol was evident from the fact that it possesses a primary and a tertiary hydroxyl group as determined by study of its infrared spectrum and that it readily absorbs one mole of hydrogen to yield the known compound 2-hydroxy-dihydro-citronellol as shown by comparison with a known infrared spectrum of the latter. The new unsaturated glycol is therefore 2-hydroxy-dihydro-geraniol, i.e., 2,6-dimethyl-6-octene-2,8-diol. Further evidence for its structure lies in the fact that it converts readily to hydroxy-citronellal when heated with copper chromite at about 165° C. for 5 hours.

It is evident from the above summation of recovered or accounted for materials that a very substantial and unaccounted for loss was involved in this exploratory experiment since hydration (partly mono, partly di-) of 544 grams of crude myrcene would yield 616 grams of product if the terpene were hydrated, on the average, to the monohydric stage. Substantial losses may be expected in handling the products of this reaction ranging from the volatile terpenic hydrocarbons to the much less volatile but quite water soluble glycols in the event suitable precautions are not taken to recover each product according to the best methods applicable to that product. Loss of glycols is particularly easy because of their water solubility, ease of decomposition on distillation, etc.

Having established the nature and identity of the products of solvolysis of myrcene dihydrochloride, additional experiments were run to establish methods for more quantitative recovery of products and more accurate data on yields of individual components of the reaction mixture. It was found that good recoveries of product were accomplished when the solvolysis product was filtered (if a water insoluble base were used in the solvolysis) and the filter cake washed with a solvent to remove adhering oil. Suitable solvents are the lower boiling alcohols and ketones which are readily recovered by distillation. The filtered reaction product is allowed to separate into layers and the oil layer removed. The aqueous layer yields further product by salting out with a soluble salt such as sodium sulfate and the like. This salted out oil is very rich in glycols and poor in hydrocarbons. The combined oils from the original separation from the reaction mixture plus the salted out oil plus the filter cake wash is fractionated to remove and collect fractions of filter cake wash solvent, terpenic hydrocarbons, monohydric terpene alcohols in the order of their boiling points, then the linalool type glycol and finally the geraniol type glycol. Sharp separations are effected with a good fractionating column except for the cis-trans isomers, geraniol/ nerol and the corresponding isomer of 2-hydroxy-dihydro geraniol. Because of the instability of the various allylic alcohols, particularly in the presence of impurities such as acids, it is preferable to employ low temperatures in the distillation pot through suitable adjustments in pressure at the head of the column. Thus, I prefer to avoid stillpot temperatures of over 160° C. and employ low distillation pressures.

Obviously many alternative procedures are available or adaptable. Thus, the filtration step may be avoided if a water soluble base such as sodium or potassium carbonate is employed for the solvolysis. As a supplement to, or as a substitute for, the salting out step, the aqueous solution containing glycols can be extracted with aromatics or with better glycol solvents such as higher alcohols or ketones or even with monohydric terpene alcohols of the type produced in the solvolysis. Also, the aqueous solution can be evaporated as a stage in the recovery. It is evident that choice of recovery methods depends largely on the economy of the method and the specific processing equipment available.

From Myrcene dihydrochloride (from 72–75% myrcene) produced in the presence of cuprous chloride and hydrolyzed with a water-lime slurry followed by careful isolation of products, the following approximate yields of individual compounds are obtained. The yield of crude hydrolyzed oil is about 110 to 120% of the weight of starting pyrolysate and this analyzes:

|  | Percent |
|---|---|
| Recovered terpene hydrocarbons including also bornyl chloride | 10–15 |
| Linalool | 3–5 |
| 2,6-dimethyl-5,7-octadiene-2-ol plus 2-methyl-6-methylene-7-octene-2-ol | 3–5 |
| Terpineol | 12–15 |
| Geranidol (includes Nerol) | 1–2 |
| 2,6-dimethyl-7-octene-2,6-diol | 45–50 |
| 2,6-dimethyl-6-octene-2,8-diol | 5–7 |
| Terpin | 1–3 |
| Higher boiling products | 3–7 |

The above analysis represents the solvolysis product from 72–75% grade myrcene (pyrolysis of 95+% beta pinene) when the myrcene content is substantially fully dihydrochlorinated and hydrolyzed substantially completely under preferred conditions. If the product is underchlorinated any monohydrohalide present will hydrolyze as described more fully in copending Serial No. 331,515, U.S. Patent No. 2,871,271, to monohydric alcohols. Further, if the hyrolysis is conducted at high temperatures say by mixing the preheated reactants at 150° C. (under pressure) the chloride at the 2-position will be removed to a greater degree by dehydrochlorination and more alpha linalool and alpha geraniol will be produced and less glycols.

It is evident that if pure myrcene were used that no bornyl chloride would be produced in the overall reaction. Further, less terpineol would be produced since at least part of the terpineol produced arises from the hydrochlorination of the limonene normally present in crude myrcene produced by beta pinene pyrolysis.

*Example 2*

Fifty-five (55) grams of 2-hydroxy-dihydro-linalool, 44 grams sodium dichromate dihydrate and 120 cc. of water were stirred at 25–30° C. while 113 grams of 50% sulfuric acid solution was added over a period of four hours. The reaction mixture was stirred for forty (40) minutes after all the sulfuric acid solution had been added. The reaction mixture was then extracted with ether and the ether extract was washed with water followed by a sodium bicarbonate wash. Removal of the ether by distillation gave 48 grams of crude oxidation product. Determination of the aldehyde content by the hydroxyl amine method and infrared spectroanalysis of the crude oxidation product showed that it contained 58–60% 2-hydroxy-2,6-dimethyl-6-octene-8-al (hydroxy-dihydro-citral). Dehydration of the crude oxidation product by refluxing it with benzene and 2% by weight of cupric chloride gave a dehydration product that contained 50–53% citral (75% alpha-form, and 25% beta form).

Fifty-five (55) grams of 2-hydroxy-dihydro-geraniol was oxidized using the above procedure to yield 50 grams of crude oxidation product. Determination of aldehyde content by the hydroxyl amine method and infrared spectroanalysis of the crude oxidation product showed that it contained 65–68% hydroxy-dihydro-citral.

Analysis for hydroxy citral and citral may also be conducted using ultraviolet methods and data applicable to the citral of commerce.

Alpha citral and beta citral boil within a few degrees of each other and need not be separated for most uses including conversion to ionones.

*Example 3*

One hundred (100) grams of 2-hydroxy-dihydro-linalool and 100 grams of formic acid (90%) were mixed at 5° C. and allowed to stand for 18 hours at 0 to 5° C. The reaction mixture was then washed with water and the oils rich in formate esters were saponified using a methanolic KOH solution to yield 91 grams of saponified oils. The saponified oils were fractionated through an efficient column at 12 mm. mercury. Infrared spectroanalysis and vapor phase chromatographic analysis of the fractions showed that the saponified oils were 1–2% linalool, 1–2% 2-methyl-6-methylene-7-octene-2-ol, 2–4% alpha terpineol, 6–8% geraniol, 8–10% 2-hydroxy-dihydro-linalool and 73–75% 2-hydroxy-dihydro-geraniol.

*Example 4*

One hundred (100) grams of 2-hydroxy-dihydro-geraniol and five (5) grams of copper chromite were heated in the stillpot of an efficient fractionating column. The distillate was taken off at 10 mm. pressure at such a rate that the head temperature remained between 128 and 130° C. The stillpot temperature was about 165° C. The reaction was complete in 8 hours. Ninety-three (93) grams of distillate were recovered. Vapor phase chromatography and infrared spectroanalysis of the distillate showed that it was about 90–95% 2-hydroxy-2,6-dimethyl-octane-8-al (hydroxy-dihydro-citronellal) and 5–10% 2-hydroxy-dihydro-citronellol. A few percent 2-hydroxy-dihydro-citral may have been present but escaped detection.

*Example 5*

One hundred (100) grams of 2-hydroxy-dihydro-geraniol and five (5) grams of copper chromite were stirred at 160–165° C. for three hours. The reaction mixture was then filtered to remove the copper chromite catalyst and fractionated through an efficient column at 1–2 mm. pressure. Vapor phase chromatography and infrared spectroanalysis of the fractions showed that the reaction product was 5–10% mono-oxygenated terpenic compounds (citronellal, citral, citronellol and isopulegol) 35–40% hydroxy-dihydro-citronellal, 10–15% hydroxy-dihydro-citronellol, 35–40% hydroxy-dihydro-citral and 5–10% hydroxy-dihydro-geraniol.

As shown above in Example 2, 2-hydroxy-dihydro-linalool can be readily oxidized with chromic acid type oxidants to yield 2-hydroxy-2-dimethyl-6-octene-8-al (hydroxy-dihydro citral). Hydroxy-dihydro citral can be readily dehydrated to produce citral. Alternatively, hydroxy-dihydro citral can be condensed with acetone to produce hydroxy-dihydro pseudo ionone. This product is readily dehydrated and cyclized to ionones. It is also shown in Example 2 that hydroxy-dihydro geraniol is likewise oxidized to the hydroxy-dihydro-citral and therefore these two glycols need not be separated in the recovery operation if they are to be processed for citral manufacture and the like.

Example 3 discloses the ready isomerization of hydroxy-dihydro linalool into hydroxy-dihydro geraniol through treatment with formic acid.

The dihydric terpene, 2-hydroxy-dihydro geraniol is readily hydrogenated over Raney nickel and the like to hydroxy-dihydro-citronellol which can then be dehydrated very readily with phosphoric acid to produce pure citronellol. It is known to hydrogenate geraniol to citronellol more or less selectively so that the major portion of the hydrogenation also always occurs at the allylic double bond. However, some hydrogenation also always occurs at the 2 and 3 double bond of geraniol so that 2,6-dimethyl-8-octanol is produced as a byproduct. Demand for this product is small and the limited selectivity of the reduction results in an economic loss. 2-hydroxy-dihydro-geraniol, however, can be smoothly and completely hydrogenated and then the double bond can be regenerated quantitatively at the 2-position to obtain a citronellol free of dimethyl octanol. 2-hydroxy-dihydro-citronellol can also readily be dehydrogenated to produce 2-hydroxy-dihydro-citronellal. The latter product, i.e. 2-hydroxy-dihydro-citronellal, is a very valuable perfumery aromatic.

It is shown in Example 4 that 3-hydroxy-dihydro-geraniol is readily converted in very high yield to hydroxy-citronellal by heating it with copper chromite under conditions whereby the hydroxy-citronellal is continuously removed from the reacting mixture.

Examples 2 and 5 show that when 2-hydroxy-dihydro-geraniol is treated to a dehydrogenation reaction with copper chromite or chromic acid, that high yields of hydroxy-dihydro-citral are obtained. Example 5 also shows that when 2-hydroxy-dihydro-geraniol is heated over copper chromite an equilibrium mixture is produced rich in hydroxy-dihydro-citronellal and hydroxy-dihydro-citral. The utility of these products has already been discussed.

All of the treatments described above can be better understood by reference to the following reactions:

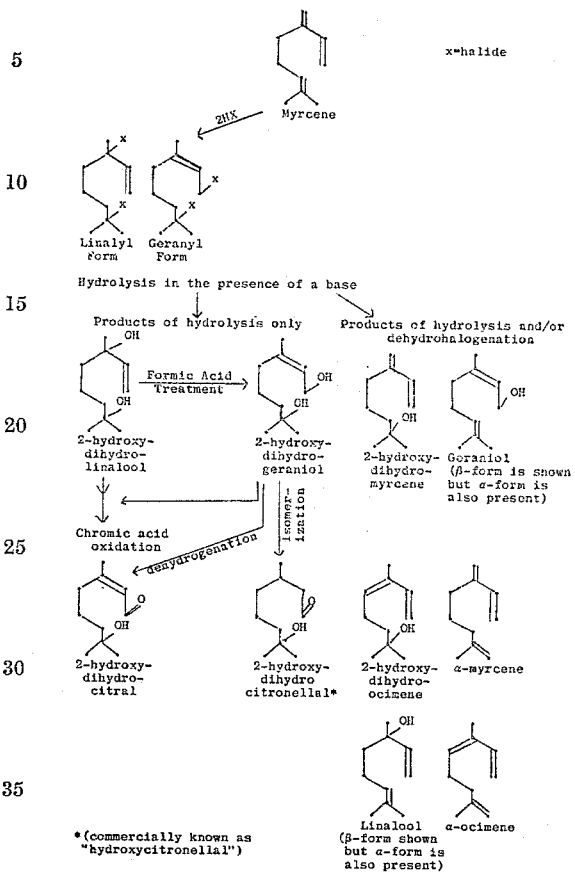

From a study of the foregoing and the examples, it is clear that I have provided through this invention a far more economical route as well as more efficient and economical intermediates for the conversion of myrcene to valuable acyclic terpenic products than is suggested and taught by the prior art.

Having thus described my invention, I hereby claim:

1. The process which comprises treating myrcene with a hydrogen halide selected from the class consisting of hydrogen chloride, hydrogen bromide and hydrogen iodide to form myrcene dihydrohalide at a temperature of from −15 to 100° C., subjecting the myrcene dihydrohalide to an aqueous alkaline hydrolysis at a temperature from about 25 to 100° C., the amount of alkaline material being sufficient to neutralize hydrohalides formed during the hydrolysis to form 2,6-dimethyl-6-octene-2,8-diol, subjecting said octene diol to a dehydrogenation reaction by treatment with a chromium compound selected from the class consisting of chromic acid and copper chromite to form 2-hydroxy-2,6-dimethyl-6-octene-8-al.

2. A process for preparing 2-hydroxy-2,6-dimethyl-6-octene-8-al which comprises essentially of treating an acyclic dihydric terpene selected from the group consisting of 2,6-dimethyl-7-octene-2,6-diol, 2,6-dimethyl-6-octene-2,8-diol and mixtures thereof with a chromic acid oxidizing agent and recovering said 2-hydroxy-2,6-dimethyl-6-octene-8-al.

3. A method for preparing 2-hydroxy-2,6-dimethyl-octane-8-al which comprises essentially heating 2,6-dimethyl-6-octene-2,8-diol at atmospheric pressure and at distillation temperatures in the presence of a catalytic quantity of copper chromite.

4. The method of claim 3 wherein the 2-hydroxy-2,6-dimethyl-octane-8-al is continuously removed by distillation from the reaction mixture.

5. The method of claim 3 wherein the 2,6-dimethyl-6- octene-2,8-diol is heated over the copper chromite until a mixture of 2-hydroxy-2,6-dimethyl-octane-8-al and 2-hydroxy-2,6-dimethyl-6-octene-8-al is obtained.

6. The process for preparing a mixture of acyclic dihydric terpenes, 2,6-dimethyl-7-octene-2,6-diol, and 2,6-dimethyl-6-octene-2,8-diol which comprises treating myrcene with a hydrogen halide selected from the group consisting of hydrogen chloride, hydrogen bromide and hydrogen iodide, said treatment being conducted at a temperature of from −15 to 100° C. by contacting said myrcene with said hydrogen halide until said myrcene is converted substantially to myrcene dihydrohalide, and subjecting the resulting myrcene dihydrohalide to hydrolysis in an aqueous solution containing a base in an amount sufficient to neutralize the hydrogen halide formed during the hydrolysis reaction, and recovering from the hydrolysis reaction said dihydric terpenes.

7. The process of claim 6 wherein the hydrogen halide is hydrogen chloride and 2,6-dimethyl-7-octene-2,6-diol is the predominant dihydric terpene produced.

8. The process of claim 6 wherein the hydrogen halide is hydrogen chloride and wherein the base used to neutralize the hydrogen chloride formed during hydrolysis is characterized also by furnishing hydroxyl ions.

9. The process of claim 6 wherein cuprous chloride is added to myrcene in catalytic quantities prior to hydrohalogenation.

10. 2,6-dimethyl-7-octene-2,6-diol.
11. 2,6-dimethyl-6-octene-2,8-diol.

References Cited in the file of this patent
UNITED STATES PATENTS

| | | |
|---|---|---|
| 2,589,275 | Naves | Mar. 18, 1952 |
| 2,871,271 | Booth | Jan. 27, 1959 |

OTHER REFERENCES

Naves et al.: Chemical Abstracts, vol. 40 (1946), p. 1450.
Royals: Advanced Organic Chemistry (1956), p. 365.
Fieser et al.: Organic Chemistry, 3rd ed. (1956), p. 115. (Copies in Library.)